K. BURKHEISER.
PROCESS OF REMOVING SULFURETED HYDROGEN FROM GASES.
APPLICATION FILED MAR. 2, 1914.
1,160,375.
Patented Nov. 16, 1915.
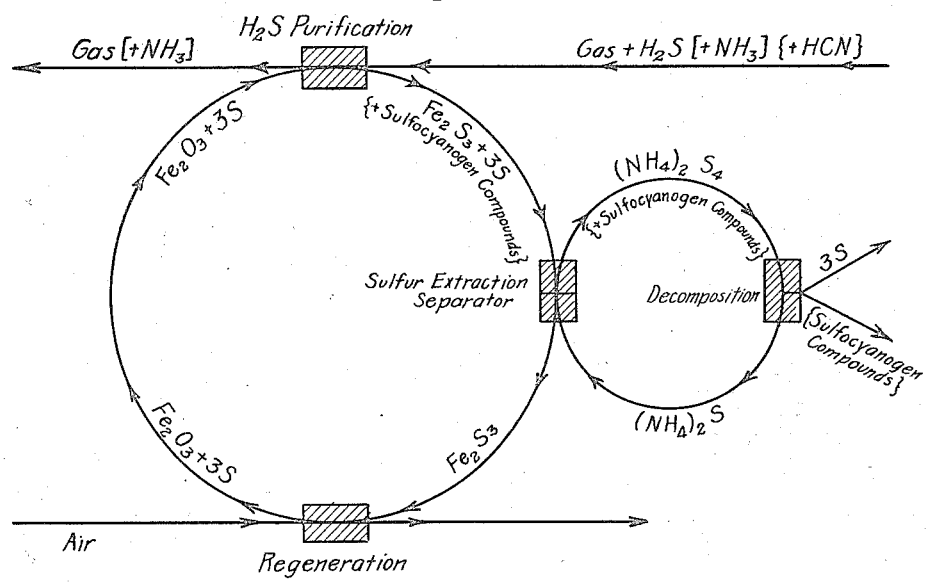
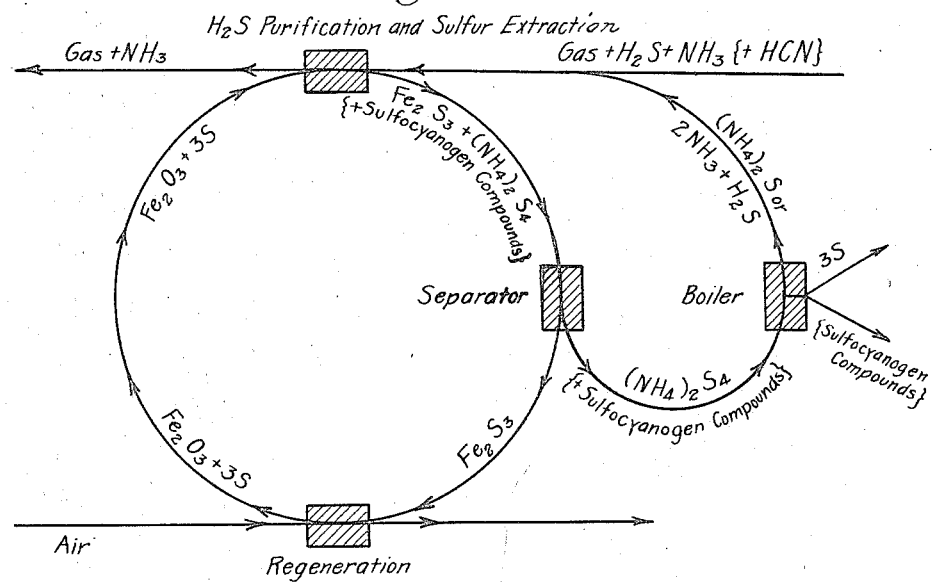

UNITED STATES PATENT OFFICE.

KARL BURKHEISER, OF FRUCHTHOF, HAMBURG, GERMANY.

PROCESS OF REMOVING SULFURETED HYDROGEN FROM GASES.

1,160,375.  Specification of Letters Patent.  Patented Nov. 16, 1915.

Application filed March 2, 1914. Serial No. 821,936.

*To all whom it may concern:*

Be it known that I, KARL BURKHEISER, a subject of the Emperor of Germany, residing at Fruchthof, Ecke Banksstrasse, Hamburg, Germany, have invented certain new and useful Improvements in Processes of Removing Sulfureted Hydrogen from Gases; and I do hereby declare the following to be a full, clear, and exact description of the invention, such as will enable others skilled in the art to which it appertains to make and use the same.

In an application for Letters Patent of the United States, Serial No. 713750, filed July 8, 1912, I have described a process wherein gas containing sulfureted hydrogen is washed with an alkaline emulsion of metal oxid or hydrated metal oxid for the purpose of removing the sulfureted hydrogen. In operating continuously, the mode of procedure is such that, for instance, hydrated iron oxid is emulsified in a watery solution of ammonia and is conducted through a washing apparatus in a direction opposed to the gas current containing sulfureted hydrogen. The ammonia in suspension removes the sulfureted hydrogen of the gas, with the formation of ammonium sulfid. The hydrated iron oxid contained at the same time in the ammonia solution regenerates the ammonium sulfid solution with the formation of iron sulfid and free ammonia solution which is thereupon utilized again anew for the absorption of sulfureted hydrogen from the gas current.

After all of the hydrated iron oxid is converted into iron sulfur compounds, the emulsion leaves the sulfureted hydrogen purification apparatus and is separated in a further special apparatus into liquid and iron sulfur compounds. The iron sulfur compounds are oxidized up to the formation of sulfurous acid and the residual hydrated iron oxid, emulsified with the ammonia solution not otherwise employed or with fresh ammonia solution, is again delivered to the sulfureted hydrogen purification apparatus.

If now the gas, as frequently happens contains oxygen, a regeneration of the iron sulfur compounds to hydrated oxid of iron and free sulfur takes place at the same time in the sulfureted hydrogen purification apparatus and principally where the hydrated iron oxid is already almost completely converted into iron sulfur compounds. The ammonium sulfid now acts upon the sulfur produced by the oxygen content of the gas from the iron sulfur compounds, with the formation of ammonium polysulfids, so that much more sulfureted hydrogen can be removed from the gas than corresponds to the combining capacity of the hydrated iron oxid introduced into the purifying process. To this advantage of the higher capacity for utilizing the metal oxid there is opposed the disadvantage that in addition to the sulfur which remains behind in the mass, sulfur is converted into ammonium polysulfid solution and must be removed therefrom.

The present invention is based upon the conception to extend this conversion of a part only of the sulfur into dissolved sulfur to all of the sulfur, and to thus recover all of the sulfur as dissolved sulfur in a uniform manner and to build up the entire process in all of its parts as a cyclic process wherein there never occurs an accumulation or a deficit in reaction products. The most obvious way would be to mix with the gases so much oxygen that all of the iron sulfur compounds be regenerated in the sulfureted hydrogen purification apparatus itself so that there would always be bound all of the sulfur as ammonium polysulfids. Inasmuch, however, as the gas cannot be mixed with so much oxygen and also because the ammonium polysulfid reacts exactly as ammonium sulfid with the hydrated iron oxid, with the formation of iron sulfur compounds, a conversion of all of the sulfur into soluble sulfur in this way is not possible. A similarly obvious way of subjecting the metal sulfids leaving the purifier to the customary oxidation so that they may consist of metal oxid and free sulfur and to extract said sulfur with alkali sulfid, similar to what has been repeatedly proposed for other sulfur extraction media, such as carbon bisulfid, etc., is not feasible because not only the alkali sulfid, but also the alkali polysulfids react with the admixed hydrated iron oxid and each molecule of hydrated iron oxid requires three molecules of alkali sulfid for its saturation. Thus, not only is the greater part of the alkali sulfid withdrawn in any event from the dissolving process but the mass must also be subjected to a special treatment for a renewed desulfurization with another sulfur dissolving medium, as otherwise, in continuous working, an uninterrupted accumulation of sulfur would take place in the mass.

The invention therefore contemplates excluding the action of the alkali sulfid upon the mass itself by bringing it into contact with the alkali sulfid in that condition which represents the final product of the reaction between metallic oxid or hydrated oxid and alkali sulfid or alkali polysulfid. Such a mode of operation may readily supplement the method above referred to, by employing for the gas purification an alkaline emulsion of metal oxid (particularly oxid of iron or hydrated oxid of iron) and sulfur and then exposing the resultant mixture of iron sulfid compounds and sulfur, before it is oxidized in any way to the action of alkali sulfid, and then effecting a separation of the liquids and the solid portions. These solid portions will then consist only of iron sulfur compounds, which, for their part, are oxidized to hydrated oxid of iron and sulfur and therefore give the same mixture which has served as the initial material for the gas purification and which consequently can be employed anew for gas purification, so that a complete cyclic process results. The sulfur is removed by the alkali sulfid from the circulation of the purifying mass in the form of alkali polysulfid and is removed therefrom in any suitable way. The alkali sulfid is, in this case, solely a dissolving medium and does not enter into any other combinations. Hence, the alkali sulfid is recovered, and, after the removal of the sulfur dissolved therein is available anew as a solvent, so that a second cycle results and a removal of the sulfur from the gas takes place. Furthermore, since all of the reaction products themselves result from the gas purifying operation itself, and are continuously produced anew in the carrying out of the two cyclic processes, the method is extraordinarily economical and can be incorporated at once into the gas purification process itself, so that any special adaptation is superfluous.

The invention further extends to the employment of the ammonia contained in the gas itself, instead of a special alkali, since the removal of the sulfureted hydrogen is undertaken immediately after the removal of the tar, i. e., the sulfureted hydrogen purification is undertaken while the gas still contains its ammonia. The use of a special alkali is therefore superfluous, because, as has been said, the ammonia contained in the gas serves as such alkali. A continuous washing out of the ammonia by the wash liquor does not take place, of course, in this sulfureted hydrogen purification after the wash liquor has been once saturated with $NH_3$.

A further development of the method relates to a particularly appropriate mode of operation for removing the sulfur from the alkali polysulfids formed in the hereinbefore described process, and to recover the sulfur as a valuable commercial product. The invention contemplates heating the liquid containing the alkali polysulfids to a temperature of 90° to 100° C., at which temperature the alkali polysulfids dissociate and liberate sulfur. In this operation sulfureted hydrogen, or sulfureted hydrogen and ammonia are freed, whereas the sulfur sinks to the bottom in a flocculent readily separable form and can be separated from the supernatent liquid by filtration and the like. This mode of operation is particularly feasible and recommendable for gases containing cyanogen. In the method hereinbefore referred to of sulfureted hydrogen purification by means of an alkaline emulsion of metal oxid or of hydrated oxid and sulfur the process can be so conducted in the treatment of gases containing cyanogen, that the cyanogen is removed from the gas and is taken up by an alkaline emulsion in the form of sulfo-cyanogen compounds. The sulfo-cyanogen compounds are in such case dissolved as readily soluble compounds in the liquid and remain, after the separation of the liquid constituents from the solid constituents in the liquid with the alkali polysulfids.

If now we heat the liquid to the temperature at which the alkali polysulfids dissociate with the separation of sulfur, we have at hand the means of recovering separately in the simplest manner the sulfo-cyanogen compounds. This is particularly economical for the reason that it affords the possibility, even within the field of coal distillation itself to transform these sulfo-cyanogen compounds into ammonia and thus to obtain a very considerable increment of the output of ammonia. By this further development of the method we recover while simultaneously purifying the gases, the impurities heretofore difficultly or not at all utilizable; sulfureted hydrogen and cyanogen, in the form of valuable commercial products (precipitated sulfur, sulfo-cyanogen compounds or ammonia) in the continuous operation of coal distillation itself.

A further development of the invention consists in using again in the process the vaporous products of dissociation, sulfureted hydrogen or sulfureted hydrogen and ammonia which are produced in the recovery of the sulfur upon the breaking up of the polysulfids, and to introduce them either into the gas current before its entrance into the sulfureted hydrogen purification apparatus (in which case sulfureted hydrogen purification and sulfur extraction take place conveniently in the same apparatus; see Figure 2 of the accompanying drawing) or by bringing the sulfureted hydrogen vapors or the sulfureted hydrogen vapors and ammonia vapors into a second apparatus and into contact with the mixture of iron and sulfur compounds and sulfur (see Fig. 1). This latter is probably as a general rule preferable, because the concentrated gases produce thereby a more highly concentrated solution of alkali polysulfids than is the case in the dilution of these gases by the coal distillation gases.

As heretofore noted, the sulfureted hydrogen of the gases in this process is recovered in the form of precipitated sulfur. The subject-matter of the invention contemplates further the combustion of this sulfur and the utilization of the $SO_2$ or $SO_3$ gases thus produced for the binding of the ammonia of the coal gases and the like. To this end there may be conveniently employed the Burkheiser method of washing the $SO_2$ gases and the ammonia-containing distillation gases with a wash liquor consisting of neutral and primary ammonium sulfite.

For the purpose of giving a diagrammatic representation of the process, I refer to the accompanying drawing, wherein—

Fig. 1 indicates the sulfureted hydrogen purification *per se*, and Fig. 2, the sulfureted hydrogen purification and sulfur extraction.

Having thus described my invention what I claim is:

1. The process of removing sulfureted hydrogen from coal gas and the like, which consists in employing for the absorption of the sulfureted hydrogen a mixture of metallic oxid (or hydrated oxid) and free sulfur in an alkaline emulsion.

2. The process of removing sulfureted hydrogen from coal gas and the like, which consists in employing for the absorption of the sulfureted hydrogen a mixture of metallic oxid (or hydrated oxid) and free sulfur in an alkaline emulsion, then treating the resulting mixture of metallic sulfids and free sulfur with alkali sulfids for the purpose of removing the free sulfur, oxidizing the residual metal sulfids to metal oxid (or hydrated oxid) and free sulfur, and returning this mixture again into the purification process.

3. The process of removing sulfureted hydrogen from coal gas and the like, which consists in employing for the absorption of the sulfureted hydrogen a mixture of metallic oxid (or hydrated oxid) and free sulfur in an alkaline emulsion, the alkali consisting of the ammonia of the gas.

4. The process of removing sulfureted hydrogen from coal gas and the like, which consists in employing for the absorption of sulfureted hydrogen a mixture of metallic oxid (or hydrated oxid) and free sulfur in an alkaline emulsion, and then, for the purpose of removing the free sulfur, treating the resulting mixture with alkali sulfids, thereby oxidizing the residual metallic sulfids to metallic oxid or hydrated oxid and free sulfur and returning this mixture again into the purification process.

5. The process of removing sulfureted hydrogen from coal gas and the like, which consists in employing for the absorption of the sulfureted hydrogen a mixture of metallic oxid (or hydrated oxid) and free sulfur in an alkaline emulsion, and then leaving the resultant mixture of metal sulfid and free sulfur in contact with the sulfureted-hydrogen-containing gas until the free sulfur present is dissolved by the alkali sulfid produced.

6. The process of removing sulfureted hydrogen from coal gas and the like, which consists in employing for the absorption of the sulfureted hydrogen a mixture of metallic oxid (or hydrated oxid) and free sulfur in an alkaline emulsion, separating from the resulting metallic sulfids the liquid containing the alkali polysulfids and sulfo-cyanogen compounds and heating the liquid until all of the sulfur precipitates out as such when the polysulfids decompose while any sulfo-cyanogen compounds present remain in solution, and restoring to the process the volatile dissociation products of the polysulfids (*i. e.*, sulfureted hydrogen and sulfureted hydrogen and ammonia).

7. The process of removing sulfureted hydrogen from coal gas and the like, which consists in employing for the absorption of the sulfureted hydrogen a mixture of metallic oxid (or hydrated oxid) and free sulfur in an alkaline emulsion, separating from the resulting metallic sulfids the liquid containing the alkali polysulfids and sulfo-cyanogen compounds and heating the liquid until all of the sulfur precipitates out as such when the polysulfids decompose, while any sulfo-cyanogen compounds present remain in solution, and restoring to the process the volatile dissociation products of the polysulfids (*i. e.*, sulfureted hydrogen and sulfureted hydrogen and ammonia), said dissociation products being admitted into the process before the entrance of the gas into the sulfureted hydrogen purification apparatus.

8. The process of removing sulfureted hydrogen from coal gas and the like, which consists in employing for the absorption of the sulfureted hydrogen a mixture of metallic oxid (or hydrated oxid) and free sulfur in an alkaline emulsion, and then forming cyclic systems in one of which the metallic oxid and the metallic sulfid circulate and in the other of which the dissolving medium and its component parts circulate, and bringing said cyclic systems to a common point of contact in a receptacle or apparatus serving as a sulfur dissolver.

9. The process of removing sulfureted hydrogen from coal gas and the like, which consists in employing for the absorption of the sulfureted hydrogen a mixture of metallic oxid (or hydrated oxid) and free sulfur in an alkaline emulsion, recovering free sulfur from the resulting alkali polysulfids, burning the said sulfur and utilizing the $SO_2$ and $SO_3$ gases thereby produced, for the binding of the ammonia of the distillation gases.

In testimony whereof I affix my signature, in presence of two witnesses.

KARL BURKHEISER.

Witnesses:
 WILLY LENZZ,
 JOHANNES VOJS.